United States Patent
Marek et al.

(10) Patent No.: US 6,498,217 B1
(45) Date of Patent: Dec. 24, 2002

(54) BRANCHING OF POLYAMIDES WITH ESTERS OF CARBONIC ACID

(75) Inventors: Miroslav Marek, Prague (CZ); Friedrich-Karl Bruder, Krefeld (DE); Konstadinos Douzinas, Köln (DE)

(73) Assignee: Bayer Aktiengesellshaft, Leverkusen (DE)

(*) Notice: Subject to any disclaimer, the term of this patent is extended or adjusted under 35 U.S.C. 154(b) by 0 days.

(21) Appl. No.: 09/635,605

(22) Filed: Aug. 10, 2000

(30) Foreign Application Priority Data

Aug. 26, 1999 (EP) .............................. 99116725

(51) Int. Cl.⁷ .............................. C08L 77/00
(52) U.S. Cl. .................. 525/433; 525/420; 525/430; 525/431
(58) Field of Search ................. 525/420, 430, 525/431, 433

(56) References Cited

U.S. PATENT DOCUMENTS

| 5,760,163 A | 6/1998 | Fisch et al. | 528/310 |
| 5,959,069 A | 9/1999 | Glück et al. | 528/332 |

FOREIGN PATENT DOCUMENTS

| DE | 2732329 | 2/1979 |
| DE | 3714607 | 11/1988 |
| EP | 0 345 648 | 12/1989 |
| EP | 0 561 630 | 9/1993 |
| EP | 0 837 086 | 4/1998 |
| GB | 749479 | 9/1954 |
| WO | 97/24388 | 7/1997 |
| WO | 97/46747 | 12/1997 |

OTHER PUBLICATIONS

Chem. Mater., 4 (month unavailable) 1992, pp. 1000–1004, John M. Warakomski, Synthesis And Properties of Star–Branched Nylon 6.

Polymer, vol. 37, No. 12, (month unavailable) 1996, pp. 2541–2545, Jaroslav Stehlicek et al Properties of aliphatic block copolyamides and homopolyamide blends prepared by combined polymerization.

*Primary Examiner*—Ana Woodward
(74) *Attorney, Agent, or Firm*—Joseph C. Gil; John E. Mrozinski, Jr.

(57) ABSTRACT

A branched polyamide and a process for its preparation are disclosed. Aliphatic or aromatic esters of carbonic acid are used as branching agents in an optionally catalyzed reaction with crystalline polyamide to produce resins having good flow properties, high degree of crystallinity and excellent mechanical properties. Amorphous polyamides that are branched in accordance with the inventive process have improved flow properties.

13 Claims, No Drawings

BRANCHING OF POLYAMIDES WITH ESTERS OF CARBONIC ACID

The present invention is related to branching of high-molecular-weight polyamides using aliphatic or aromatic esters of carbonic acid.

There are few examples in both patent and academic literature concerning branching of polyamides (PA) and related polymers. Branching of polymers causes broad molecular weight distribution and generally leads to change of melt flow behavior in comparison with linear analogous polymers. Such polymers show non-Newtonian (structural viscous) melt flow in the broad range of shear rates. This is important for the processing of plastics since it extends their processing window. Such polymers can be applied for processing requiring high strength of the melt (e.g. blow extrusion) as well as for processing, where high flow is necessary (e.g. fast injection molding).

Branching of polyamides is a way to extend a processing window of polyamides. For instance, for extrusion, which operates at shear rates $10^2$–$10^3$ 1/s order of magnitude, high polymer melt strength is necessary. On the other hand, for injection molding which operates at shear rates $10^3$–$10^4$ 1/s order of magnitude, higher flow is desired in order to produce large articles and replicate fine details. It means that we need polymer, which shows high melt viscosity at low shear rates (or at low red. radial frequencies) and low melt viscosity at high shear rates (or at low red. radial frequencies). Such behavior is typical for structural viscous melts. Since structural viscosity is common for branched polymers, branching of polyamides makes possible to apply various processing techniques to these polymers.

Both ring opening polymerization of lactams and polycondensation reactions were used for syntheses of branched polyamides.

Melt polycondensation using low concentration of multifunctional comonomer is a common way of preparing branched polyamides. Bishexamethylenetriamin (GB 749479), compounds of the general formula $H_2N$—R—NH—R—$NH_2$ (DE-2732329), $(H_2N$—$(CH2)_n)_2N$—$(CH_2)x$-N—$((CH_2)_n$—$NH_2)_2$ (DE-19654179), amino-groups containing dendrimers (DE-19654179) are used as multifunctional amines. Also tri- and tetracarboxylic acides were used as a branching agents: 3,5,3',5'-biphenyltetracarboxylic acid, 1,3,5,7-naphthalenetetracarboxylic acid, 2,4,6-pyridintricarboxylic acid, 3,5,3',5'- bipyridyltetracarboxylic acid, 3,5,3',5'- benzophenonetetracarboxylic acid; 1,3,6,8-acridintetracarboxylic acid, trimesic acid and pyromellitic acid (EP-774480). Polyacids or polyamines are described as branching agents for syntheses of polyamides via polycondensation of nylon salts or co-aminoacids, and for polymerization of lactams (EP-345648). Other branching agents used for analogous syntheses of branched polyamides are pyrandicarboxylic acids and their esters (DE-4100909) or α-amino-ε-caprolactam (DE-3714607) or amino acid containing more than one amino- or carboxylic groups (Polymers for advance technologies 6, 1995 pp. 373–382).

Application of multifunctional initiator on the polymerization of lactams leads to formation of star branched polyamides (WO-9746747, WO-9724388, Chem. Mater.4, 1992, pp.1000–1004). Termination of hydrolytic polymerization of ε-caprolactam with tetra- and octacarboxylic linking agents leads to formation of star shaped nylon-6 polymer. On the other hand activation of anionic polymerization of lactams with trimesoyl-tris-caprolactam leads to three armed polymer. Similar structure can be obtained by cationic polymerization of lactams initiated by ammonium cations of tris-2-aminoethylamine neutralized with HCl (ACS Symp. Ser. 30 (1) 1989, pp.117–118).

Anionic polymerization of lactams on the polyamide chains containing N-benzoyl-side groups makes it possible to manufacture polyamides with branches of other chemical structure than the main chain (Polymer 37, 1996 pp. 2541–2545).

Most of the described methods, although leading to high molecular weight branched polyamides, are difficult to carry out in large-scale productions. Moreover, besides reaction control difficulties, these methods can hardly produce materials of desired branched structures. They need solvent and often also special equipment is necessary. These drawbacks increase in consequences the production costs and the manufacturing is more complicated.

The branching affects properties of polymers both in the molten state and in solution and therefore it is a useful way to improve the processibility of polymers. Especially for the production efficiency of fiber forming technologies and injection molding processes, the decrease of the production cycle time is essential. Therefore, in the case of semicrystalline polyamides, there is a demand to improve flow properties of polyamide melt without negative impact on crystallisation time.

Branching reactions should not lead to low-molecular-weight side chains in the case of semi-crystalline polyamides, since short branches causes decreases of crystallinity. Low content of crystalline phase leads to deterioration of mechanical properties. Polymer stiffness decreases dramatically, but also tensile strength, modulus, hardness and abrasion resistance are negatively affected by decrease of crystallinity. Also water- and gas-barrier properties depend on the content of crystalline phase.

It was now surprisingly found that commercially available polyamide can be easily branched using diesters of carbonic acid e.g. diphenylcarbonate (DPC) and dimethylcarbonate (DMC) as branching compounds.

The new high-molecular weight polyamides branched by diesters of carbonic acid have surprisingly excellent flow properties and a high degree of crystallinity, which results in excellent mechanical properties, especially high stiffness. In the case of fully amorphous polyamides the above described branching can improve the flow properties.

The invention also concerns a process to synthesise branched polyamides by reaction of commercially available linear polyamides with dimethylcarbonate and diphenylcarbonate (or by other ester of carbonic acid). Such a process makes it possible to retain high degree of crystallinity after polymer branching and the polymers exhibit structural viscous behavior. The reaction proceeds under similar conditions as those used for the melt synthesis of polycarbonates (high temperatures and low pressures). Temperatures range between 250–350° C. and pressures are adjusted to 0,05 to 30 mbar, preferred 0,05 to 10 mbar and most preferred 0,5 to 1 mbar. The reaction proceeds according to the Scheme I.

Scheme I

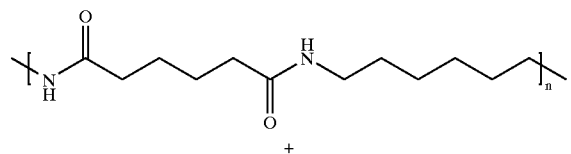

+

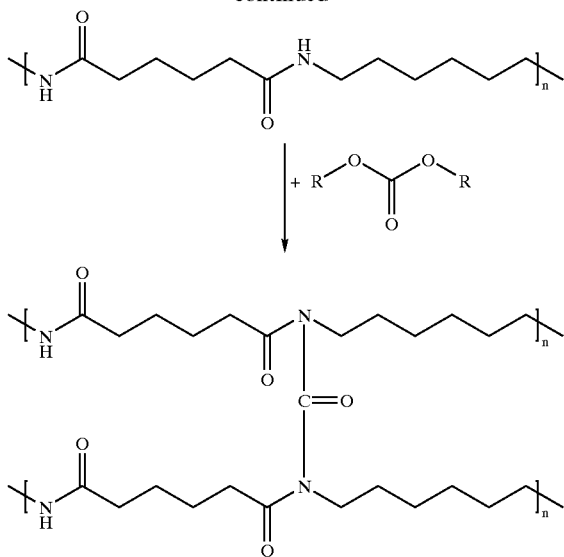

Branching can be carried out in the reactor made out of glass, metal or other material as well as in the kneader or extruder. The combination of these reaction conditions is also possible. For instance, a polymer is at first extruded in order to obtain a granulate with regular distribution of the branching agents and then the reaction is completed in the glass reactor. Special attention must be paid in order to prevent oxidation of the molten polyamide by air oxygen which leads to dark product with obviously poor mechanical properties. Provided that the reaction takes place in the glass reactor, intensive stirring using appropriate stirrer prevent deposition of polyamide onto the wall of the reactor, which could cause irregular branching and deterioration of the polymer color.

Blanketing the reactive melt with nitrogen is preferred. The danger of product deterioration is high especially when the reaction is over and the reaction mixture cools down. Therefore cooling is preferred to be carried out in nitrogen (or other inert gas) stream.

Amide-bond containing polymers are suitable for such a reaction, e.g.: poly($\epsilon$-caprolactam) (PA-6), polyhexamethyleneadipamide (PA-6,6), polyhexamethyleneazelainamide, polyhexamethylenesebacinacidamide, polyamide PA-11; PA-12; PA-4,6; PA-6,12, poly(amide-imide)s, poly(amide-ester)s, their copolymers and their mixtures.

In the case of aramides, those prepared from isophthalic acid and/or terepthtalic acid (or their derivatives) or their mixtures (or mixtures of their derivatives) are preferred for branching. Suitable aromatic diamines include: 1,4- 1,3 or 1,2- diaminobenzene, 1,3-diaminobenzoic acid and their derivatives, 2,4- 2,5- 2,6-diaminotoluen, benzidine and diamines containing antrachinon, diphenylether, diphenylmethan, benzophenone, anisol, acridin, fluoren (and analogous methylated or methoxylated compounds), indan etc. Semiaromatic polyamides can be also branched using diesters of carbonic acid, the most preferred is polymer based on isophthalic acid and hexamethylenediamine (e.g. PA I,6). The branching can be applied on a mixture of polyamides as well as for their blends with other polymers.

As a branching agent the following diesters of carbonic acid are preferred: diphenylcarbonate, dimethylcarbonate, ditolylcarbonate, bis(chlorophenyl)carbonate, bis(m-cresyl) carbonate, dinaphthylcarbonate, diethylcarbonate, dibutylcarbonate, dicyclohexylcarbonates. Besides low-molecular diesters of carbonic acid oligomers polymers end-capped with alkoxy carbonyloxy- or phenoxycarbonyloxy-groups can be used. Preferred alkoxy-groups are methoxy- and ethoxy- groups. The preferred end-capped polymers (or oligomer) branching agent are compounds of formula II.

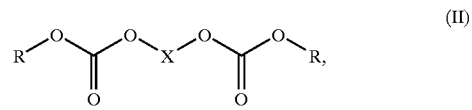

(II)

wherein —O—X—O— is selected from the group:

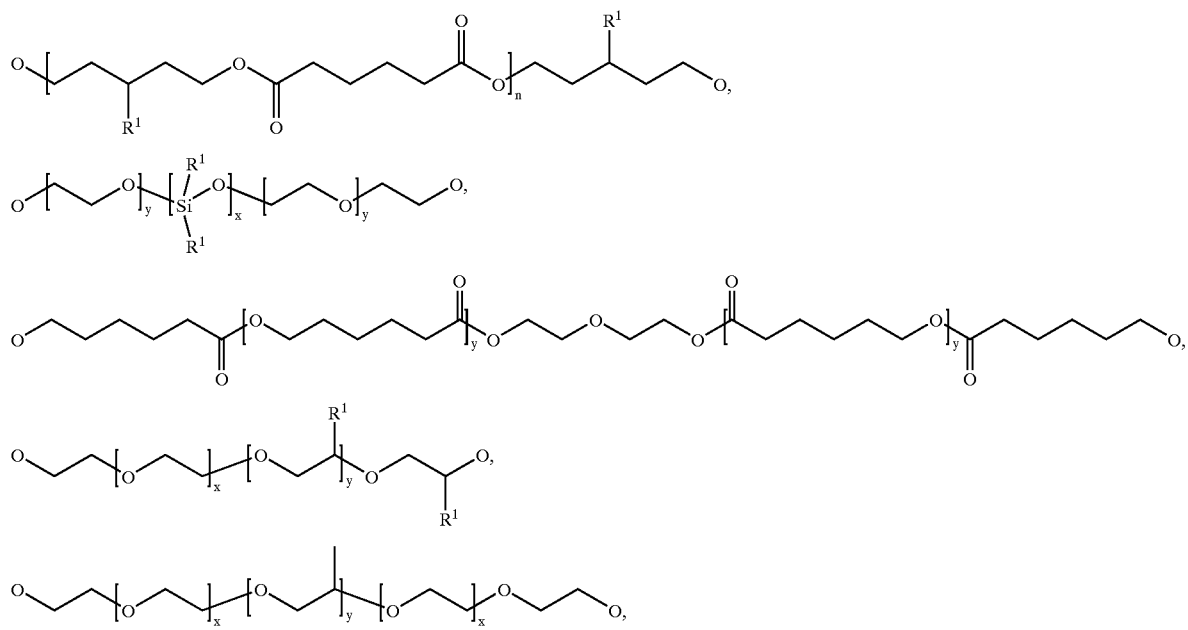

-continued

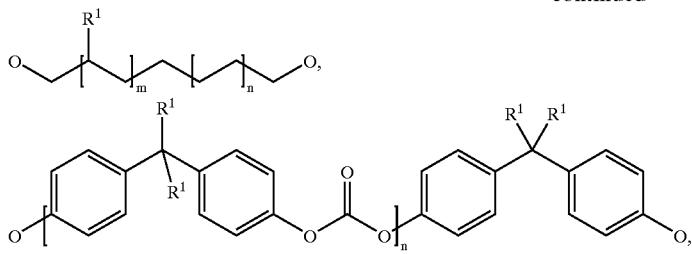

with
R, R¹=Aryl, substituted Aryl, Alkyl and x, y, m, n are integers.
R=phenyl, methyl, ethyl, propyl are preferred.

Especially preferred are branching agents III and hydrogenated polybutadiene ester (formula IV) such as Kraton Liquid Shell HPVM-2203. The concentration of the branching agent is between 0,0001 and 6 mol %, preferred 0,0001 and 3 mol. %, the range 0,1–1%, relative to the polyamide, is very preferred. In higher concentration of diesters of carbonic acid crosslinking can occur.

(III)

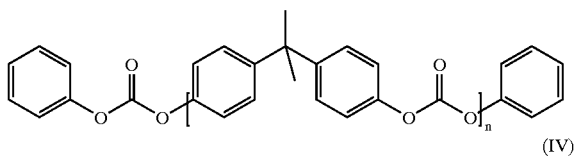

(IV)

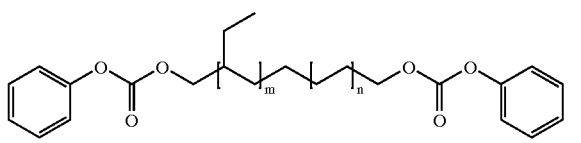

The branched polymers of the invention can be described as polyamides with branching bridges

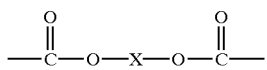

and/or

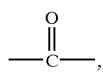

linked to the amide group, wherein —O—X—O has the above described meaning.

For the branching of polyamides common catalyst known from syntheses of polycarbonates via transesterification may be used. Following are compounds suitably used as such catalysts: tetraalkylammonium, tetraalkylphosphonium, tetraarylphosphonium phenolates and hydroxides, both aliphatic and aromatic primary, secondary and tertiary amines, imidazoles such as 2-methylimidazole and 2-phenylimidazole, tetramethylammonium borohydride, tetrabutylammonium borohydride, tetrabuty-lammonium tetraphenylborate, tetramethylammonium tetraphenylborate. Other well known suitable catalysts involve titanium, zinc, tin, antimony and lead compounds. Preferred are tetrakis(2-ethylhexyl)titanate, titanium (IV) butoxide, dibutyl tin oxide, tin(IV)oxide, dioctyl tin oxide, dioctyl tin dilaurate, butyl tin hydroxide oxide, octyl tin hydroxide, zinc (II) oxide, lead phenolate, lead acetate etc. Other possible catalytic systems are described in EP-837086 and EP-561630 (and references there): organic acid salts, inorganic acid salts oxides, hydroxides, hydrides, alkoxides and phenolates based on alkali metals and alkaline-earth metals. The most preferred salts are carbonates, stearates, borates, benzoates, hydrogen carbonates and acetates of alkali metals and alkaline-earth metals. The most preferred concentration of catalysts is 100–1000 ppm, but in principle the concentrations can vary in the range of $10^{-9}$–$10^{-3}$ moles of catalysts based on 1 mole of diol.

As UV stabilizers, used in concentration not higher than 2 wt. %, mention may be made of substituted resorcinols, salicylates, benzenetriazole benzophenone, etc. Organic dyes (such as Nigrosin) and inorganic and/or organic pigments such as titaniumdioxide, cadmiumsulfide, cadmiumselenide, phthalocyanin, ultramarine blue and various iron oxides can be also used. Fillers can be incorporated into polyamides in order to modify their properties. For instance carbon fibers, glass fibers, $SiO_2$, asbest, calciumsilcate, wollastonite, aluminiumsilicate, magnesiumcarbonate, kaolin, chalk, quartz, mica etc. can be used.

The concentration of the optional fillers and pigments (or dyes) generally should not exceed 50 wt. %, relative to the weight of the branched polyamide, the concentration range between 2 and 35 wt. % is preferred.

Calciumfluoride, sodiumphenylphosphinate, aluminiumoxide, teflon and other fluorocarbon polymers (in the form of fine particles) can be applied as nucelation agents. Dioctylphthalate, dibenzylphthalate, hydrocarbons, N-(n-butyl)-benzen-sulfonamid, o- and p- toluensulfonamide can be used as examples of flexibilizers. Besides flame retardants, oxidation inhibitors and retardants can also be added. Na-, K-, lithiumhalides (optionally with copper (I)-halides), stearically hindered phenols, diphenylamine and other sec. aromatic amines, hydroquinone, etc. can be applied for such purpose in the concentration up to 1 wt. %.

Melting temperatures $T_m$, melting enthalpies $\Delta H_m$ and degrees of crystallinity are together with molecular weight characteristics summarized in Table 1. Differential scanning calorimetry (DSC) with a heating rate 20° C./min. was used to measure thermal data. Branching polyamide 6,6, causes a very low decrease of the content of crystalline phase when low-molecular weight branching agent was applied. The content of crystalline phase in polyamide was calculated from the ratio of $\Delta H_m$ of semicrystalline polymer and $\Delta H_m$ of fully crystalline polyamide. These results indicate that such branching causes only very low decrease of crystallinity. Temperatures corresponding to the melting of polyamide decrease due to branching with diesters (DPC, DMC) by not more than 7,6° C.

The concentration of crystalline phase in polyamide 6,6 after branching is relatively close to those of branched polyamide 6,6 when DPC is used. The difference in crystallinity before and after branching is in the case of DPC-branched polyamide 6,6 just 2%. Decrease of melting temperature caused by branching is very low. Amorphous polyamide Durethane T 40 showed after branching with 1 mol. % DPC almost negligible increase of the glass transition temperature.

Gel permeation was used for determination of averages of molecular weights and molecular weight distributions. While the number averages increase due to branching by factor 1,44 or less, the weight averages were increased due to branching by factor ranging between 2,65 and 4,48. GPC chromatograms revealed either monomodal or bimodal (which probably indicates just partly branched polymer) distribution of molecular weights. It was found, that Mw of branched polyamide 6,6 Durethan AC 30® increased with concentration of DPC (measured in the range 0–1 mol %) while Mn remains almost constant.

In the Table II, there are summarized complex melt viscosity data for different shear rates typical for various processing techniques. As we see branched polymers show substantial higher viscosity at shear under 5-500s$^{-1}$ compared with linear analogous polymers. On the other hand, both branched and linear PA-6 showed the same melt viscosity at high shear rates. It indicates, that such branched PA-6 is exceptionally suitable for both extrusion and injection molding processing.

The branched polyamide molding compounds of the invention can be used for the production of molded articles. The invention also relates to molded articles produced from the inventive branched polyamide. Molded articles can be produced from branched polymides by injection molding, compression molding, (co)extrusion molding, blow extrusion, one or two stage injection stretch blow molding, vacuum forming, airpressure forming, rotation forming and foaming molding.

EXAMPLES

In the Table I there are compared some important properties of linear polyamides and those branched according this invention (Examples 1–8). Melting enthalpy $\Delta H_m$ and melting temperature $T_m$ were determined using Mettler DSC-30 using heating rate 20° C./min in nitrogen. Crystallinity was calculated from the ratio of the melting enthalpy of the sample and tabled enthalpy of 100% crystalline polyamide. Gel permeation chromatography experiments were carried out using GPC Hewlett-Packard 1050 (modular system) apparatus with calibration to polyamide 6 and RI detection. Concentration of the polymer in hexafluoroisopropanol was 1 g/l and the flow rate was 0,5 ml/min. Viscometric experiments were carried out using Ubbelohde viscometer at 25° C. using 1 wt. % solution in m-cresol.

For kneading experiments, as a proof of a reaction of polyamid 6 with 5 mol % diphenylcarbonate, a twin screw kneader Haake Rheomix 600 in connection with the processing unit Haake Rheocord 90 was heated to 320° C. and rotation speed 60 rpm. Table I shows melting and molecular-weight characteristics and content of crystalline structure. for samples prepared according examples 1–8.

Synthesis of α,ω-bis(phenoxycarbonyloxy)poly(ethylene-co-butylene) (DPP)

167,5 g (0,05 mol) Kraton Liquid Shell HPVM 2203 was dissolved in 1000 ml of dried methylenechlorid containing 10,28 g (0,065 mol) of pyridine and the solution is cooled to 0–5° C. Then, 12,20 g phenylester of chlorformic acid (0,1 mol) was added at 5–10° C. After that, the reaction was refluxed for 5 hours and then let overnight at room temperature. The product was washed with 200 ml of 5% HCl and then with pure water. Organic phase was separated and the solvent was removed by rotary evaporation.

Example 1

A three neck glass reactor equipped with capillary for nitrogen inlet condenser, mechanical stirrer and a tube for nitrogen inlet during cooling was charged by 3,51 g α,ω)-bis(phenoxycarbonyoxy)-poly(ethylene-co-butylene) in 10 g phenol, 22,37 g polyamide 6,6 (Durethane® AC-30, Bayer AG Leverkusen, Germany, rel. viscosity=2.786) and 0,17 g tetraphenylphosphonium phenolate (catalyst, 70% in phenol) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 2

A three neck glass reactor equipped with capillary for nitrogen inlet condenser, mechanical stirrer and a tube for nitrogen inlet during cooling was charged by 0,09 g dimethylcarbonate, 22,37 g polyamide 6,6 (Durethane® AC-30, Bayer AG Leverkusen, Germany, rel. viscosity=2.786) and 0,17 g tetraphenylphosphonium phenolate (catalyst, 5% in butanon) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 3

A three neck glass reactor equipped with capillary for nitrogen inlet condenser, mechanical stirrer and a tube for nitrogen inlet during cooling was charged by 0,02 g diphenylcarbonate, 22,37 g polyamide 6,6 (Durethane® AC-30, Bayer AG Leverkusen, Germany, rel. viscosity=2.786) and 0,17 g tetraphenylphosphonium phenolate (catalyst, 5% in butanon) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 4

A three neck glass reactor equipped with capillary for nitrogen inlet condenser, mechanical stirrer and a tube for nitrogen inlet during cooling was charged by 0,11 g diphenylcarbonate, 22,49 g polyamide 6,6 (Durethane® AC-30, Bayer AG Leverkusen, Germany, rel. viscosity=2.786) and 0,17 g tetraphenylphosphonium phenolate (catalyst, 5% in butanon) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 5

A three neck glass reactor equipped with capillary for nitrogen inlet condenser, mechanical stirrer and a tube for nitrogen inlet during cooling was charged by 0,045 g dimethylcarbonate, 22,49 g polyamide 6,6 (Durethane® AC-30, Bayer AG Leverkusen, Germany, rel. viscosity=2.786) and 0,17 g tetraphenylphosphonium phenolate (catalyst, 5% in butanon) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 6

A three neck glass reactor equipped with capillary for nitrogen inlet condenser, mechanical stirrer and a tube for nitrogen inlet during cooling was charged by 0,02 g diphenylcarbonate, 22,37 g polyamide 6,6 (Durethane® AC-30, Bayer AG Leverkusen, Germany, rel. viscosity= 2.786) and 0,17 g tetraphenylphosphonium phenolate (catalyst, 5% in butanon) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 7

A three neck glass reactor equipped with capillary for nitrogen inlet condenser, mechanical stirrer and a tube for nitrogen inlet during cooling was charged by 0,21 g diphenylcarbonate, 21,58 g semiaromatic polyamide (Durethane® T 40, Bayer AG Leverkusen, Germany, rel. viscosity=2.377) and 0,17 g tetraphenylphosphonium phenolate (catalyst, 5% in butanon) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 8

A three neck glass reactor equipped with capillary for nitrogen inlet condenser, mechanical stirrer and a tube for nitrogen inlet during cooling was charged by 0,21 g diphenylcarbonate, 22,37 g polyamide 6 (Durethane® B 30 S, Bayer AG Leverkusen, Germany, rel. viscosity=2.732) and 0,17 g tetraphenylphosphonium phenolate (catalyst, 5% in butanon) The stirred molten mixture was heated up to 300° C. and kept at pressure 0,5 bar for 1 hour to allow distillation of the reaction phenol. After that, the mixture was slowly cooled at atmospheric pressure under a stream of nitrogen.

Example 9

Branching of polyamide 6,6 in kneader

Twin screw kneader Haake Rheomix 600 in connection with the processing unit Haake Rheocord 90 was heated to 290° C., charged by 49,3 g Polyamide 6,6 (Durethan B 30 ®, Bayer AG Leverkusen, Germany, rel. viscosity=2.732) (0,1425 mol), 1,6067 g diphenylcarbonate (0,0075 mol) and 0,2573 g catalyst (tetraphenylphosphonium phenolate, 5% wt. % solution in butanone) under a stream of nitrogen and kneaded for one hour.

Example 10

Branching of polyamide 6,6 in an extruder

Twin screw extruder Haake Rheometrix TW 100 in connection with the processing unit Haake Rheocord 90 was heated to 300° C., charged by 337,305 g polyamide 6 (Durethan® R 305, Bayer AG Leverkusen, Germany, rel. viscosity=2.732) (1,4925 mol), 1,60665 g diphenylcarbonate (0,0075 mol) and 0,2573 g catalyst (tetraphenylphosphonium phenolate, 5 wt. % in butanon) under a stream of nitrogen, then kneaded for one hour at 60 rings/minute and finally granulated. The product thus prepared was four times repeatedly extruded and granulated.

Example 11

Branching of polyamide 6 subsequently in the kneader and in the reactor

Polyamide 6 kneaded with diphenylcarbonate as described in the Example 9 was further heated in the three neck glass reactor equipped with capillary for nitrogen inlet, condenser, mechanical stirrer and a tube for nitrogen inlet during cooling. The stirred molten mixture was heated up to 300° C. and kept at pressure 0,5mbar for 1 hour to allow distillation of the reaction phenol. After that, the mixture was cooled at atmospheric pressure under stream of nitrogen.

Example 12

Branching of polyamide 6 subsequently in the extruder and in the reactor

Polyamide 6 extruded with diphenylcarbonate as described in the Example 10 was further heated in the three neck glass reactor equipped with capillary for nitrogen inlet, condenser, mechanical stirrer and a tube for nitrogen inlet during cooling. The stirred molten mixture was heated up to 300° C. and kept at pressure 0,5 mbar for 1 hour to allow distillation of the reaction phenol. After that, the mixture was cooled at atmospheric pressure under stream of nitrogen.

In the Table II there are shown values of complex viscosity in different shear rates corresponding to conditions common for compression molding ($5^{s-1}$), extrusion ($500$ $s^{-1}$) and injection molding ($5000$ $s^{-1}$) for linear and branched polyamides. Complex viscosity vs. reduced radial frequency plot was measured using Physica MC 200 Core Plate Rheometer in oscillation mode with a constant deformation at 10% in the frequency range 100 Hz–0,1 Hz. Master curves were constructed at a reference temperature 300° C.

TABLE 1

Characteristics of linear and branced polyamides using DSC, GPC and viscometry.

| Example | Branching* agent (mol %) | Polyamid** | Melting enthaply $\Delta H_m$ (J/g) | Melting temperature $T_m$(° C.) | Crystallinity % | $M_n \times 10^{-4}$ | $M_w \times 10^{-4}$ | $M_w/M_n$ | $\eta_{rel}$ |
|---|---|---|---|---|---|---|---|---|---|
| for Comparison | | PA-6.6 | 68.0 | 260.7 | 35 | 1.25 | 3.09 | 2.47 | 2.786 |
| 1 | DPP 1% | PA-6.6 | 57.3 | 259.6 | 29 | — | — | — | 3.494 |
| 2 | DMC 1% | PA-6.6 | 60.4 | 255.6 | 31 | — | — | — | 3.685 |
| 3 | DPC 0.1% | PA-6.6 | 64.5 | 257.0 | 33 | — | — | — | — |
| 4 | DPC 0.5% | PA-6.6 | 65.7 | 258.0 | 33 | 1.80 | 10.29 | 5.72 | 3.626 |

TABLE 1-continued

Characteristics of linear and branced polyamides using DSC, GPC and viscometry.

| Example | Branching* agent (mol %) | Polyamid** | Melting enthaply $\Delta H_m$ (J/g) | Melting temperature $T_m$(° C.) | Crystallinity % | $M_n \times 10^{-4}$ | $M_w \times 10^{-4}$ | $M_w/M_n$ | $\eta_{rel}$ |
|---|---|---|---|---|---|---|---|---|---|
| 5 | DMC 0.5% | PA-6.6 | 61.0 | 256.8 | 31 | — | — | — | 6.011 |
| 6 | DPP 0.5% | PA-6.6 | 53.5 | 253.0 | 27 | — | — | — | 4.840 |
| for Comparison | — | Transparent PA | — | — | amorphous | 1.03 | 3.23 | 3.14 | 2.337 |
| 7 | DPC 1% | Transparent PA | — | — | amorphous | 1.14 | 14.47 | 10.33 | 4.997 |
| for Comparison | — | PA-6 | 73.6 | 219.1 | 38 | 1.15 | 2.97 | 2.58 | 2.732 |
| 8 | DPC 1% | PA-6 | 68.9 | 217.9 | 32 | 1.21 | 7.86 | 6.50 | 2.885 |

*DPP = α, ω-bis(phenoxycarbonyloxy)poly(ethylene-butylene); DMC = dimethylcarbonate, DPC = diphenylcarbonate $M_n$-number average of molecular weights, $M_w$ = weight average of molecular weights, $\eta_{rel}$ = viscosity at 25° C., 1 wt. % in m-cresol
**PA-6.6: Durethane AC 30 ®, Bayer AG, Germany; PA-6: Durethane B 30 ®, Bayer AG, Germany; Transparent PA: Durethane T 40 ®, Bayer AG, Germany.

TABLE II

Complex viscosity of branched and linear polyamides at different shear rates.

| Polymer | Branching agent (mol %) | Example | Complex viscosity (Pa s) Shear rate 5 s$^{-1}$ | Shear rate 500$^{s-1}$ | Shear rate 5000$^{s-1}$ |
|---|---|---|---|---|---|
| PA-6 | — | — | 80 | 80 | 50 |
| PA-6 | DPC 1% | 8 | 500 | 120 | 50 |
| Transparent PA | — | — | 1000 | 200 | 50 |
| Transparent PA | DPC 1% | 7 | 7000 | 600 | 120 |

PA-6 = Durethan B 30 S ®, Bayer AG, Germany, rel. viscosity = 2.732
Transparent PA = Durethan T 40 ®, Bayer AG, Germany, rel. viscosity = 2,377

What is claimed is:

1. A branched polyamide having branches of the formula

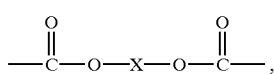

wherein —O—X—O— is a member from the group consisting of

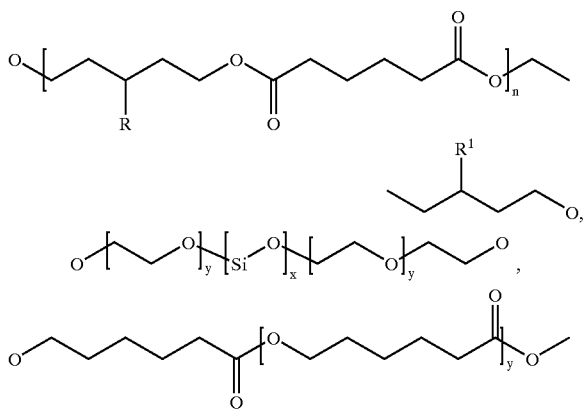

wherein $R^1$ represents an aryl or alkyl group and x, y, n, m are integers.

2. The branched polyamide according to claim 1, wherein $R^1$ represents a member selected from the group consisting of phenyl, methyl, ethyl and propyl.

3. The branched polyamide according to claim 1 wherein the polyamide is at least one (co)polymer selected from the group consisting of polyamide 6; polyamide 66; polyhexamethyleneazelainamide; polyhexamethylenesebacin-acid-amide; PA-11; PA-12; PA4,6; PA-6,12; poly(amide-imide) and poly(amide-ester).

4. The branched polyamide according to claim 1 obtained by the reaction of at least one diester with polyamide.

5. The branched polyamide according to claim 4, wherein the diester is at least one member selected from the group consisting of aromatic carbonate and (cyclo)aliphatic carbonate.

6. The branched polyamide according to claim 4, wherein the diester is a polymer or oligomer having alkoxycarbonyloxy or phenoxycarbonyloxy end groups.

7. The branched polyamide according to claim 6, wherein the alkoxycarbonyloxy is at least one member selected from the group consisting of methoxy- and ethoxy- carbonyloxy.

8. The branched polyamide according to claim 4 wherein the reaction is performed in a glass-reactor, a metal-reactor, a kneader or an extruder.

9. A process for the preparation the branched polyamide according to claim 1 comprising a reaction of polyamide with at least one diester.

10. The process according to claim 9, wherein the reaction is catalyzed by at least one transesterification catalyst.

11. The process according to claim 9 wherein the reaction is carried out under pressure of 0.05 to 30 mbar.

12. The process of claim 11, wherein the pressure is 0.05 to 10 mbar.

13. A molded article comprising the branched polyamide according to claim 1.

\* \* \* \* \*